No. 762,590. PATENTED JUNE 14, 1904.
R. S. LAWRENCE.
COOKING RANGE.
APPLICATION FILED AUG. 3, 1903.
NO MODEL. 3 SHEETS—SHEET 1.
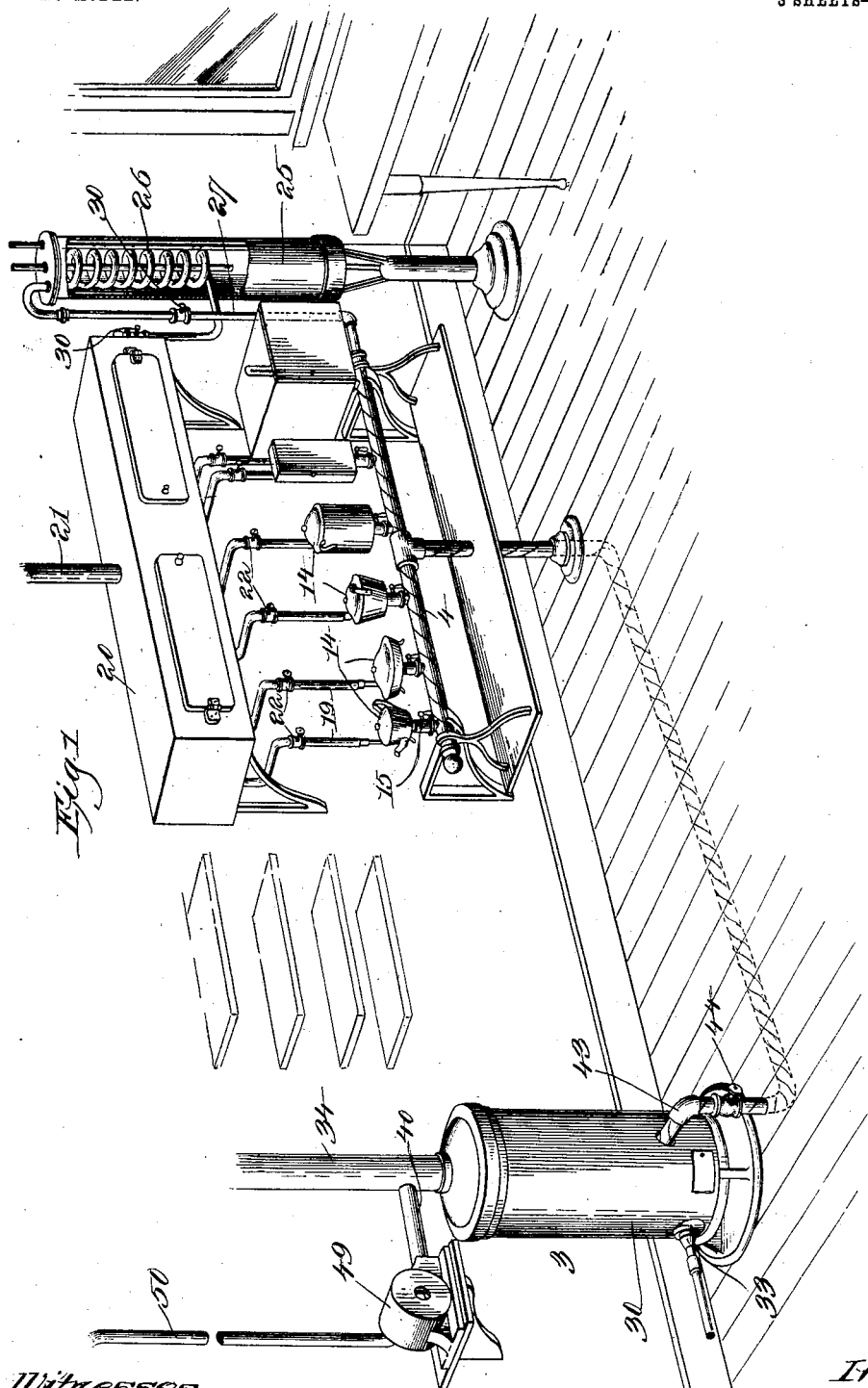

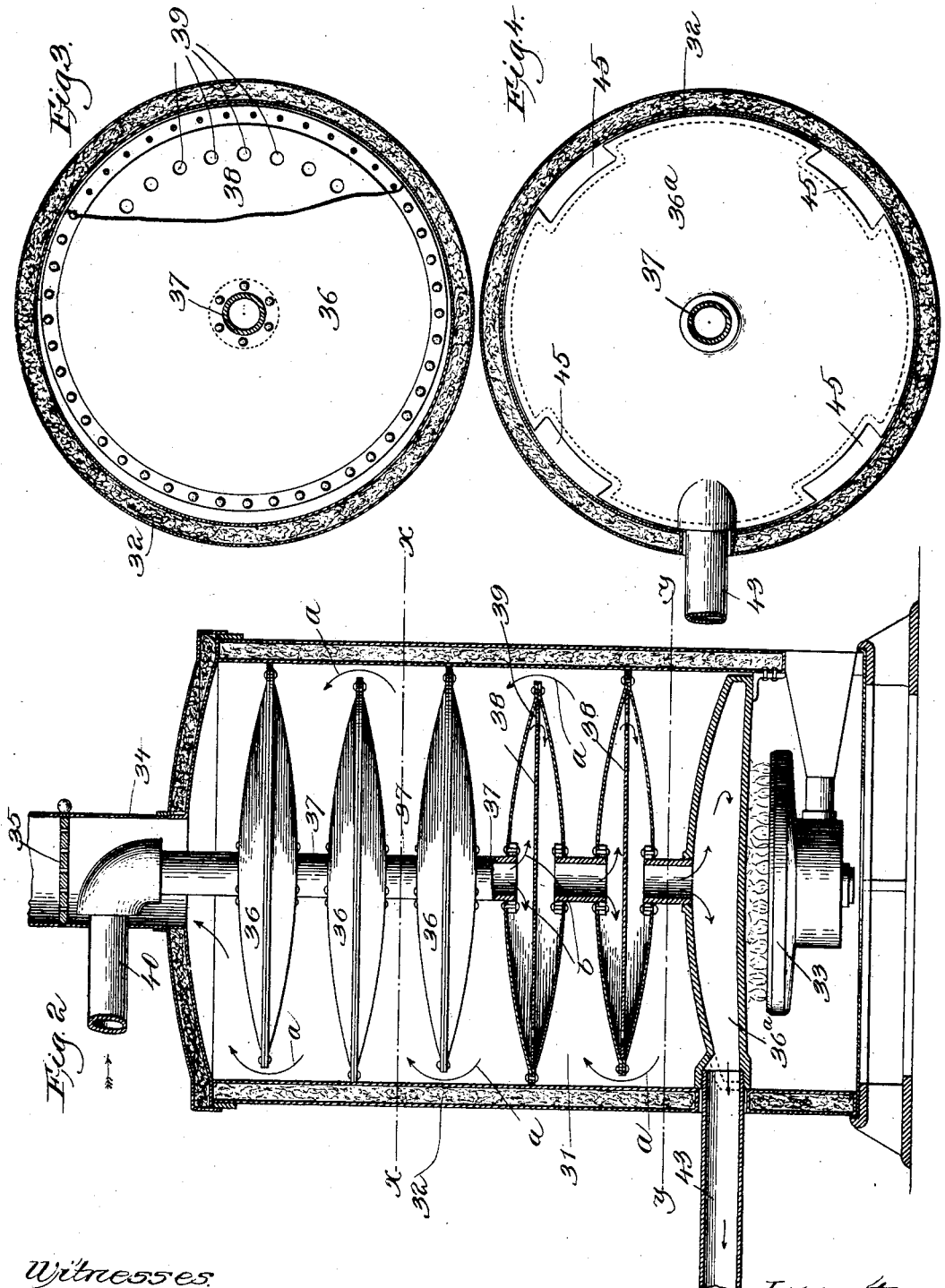

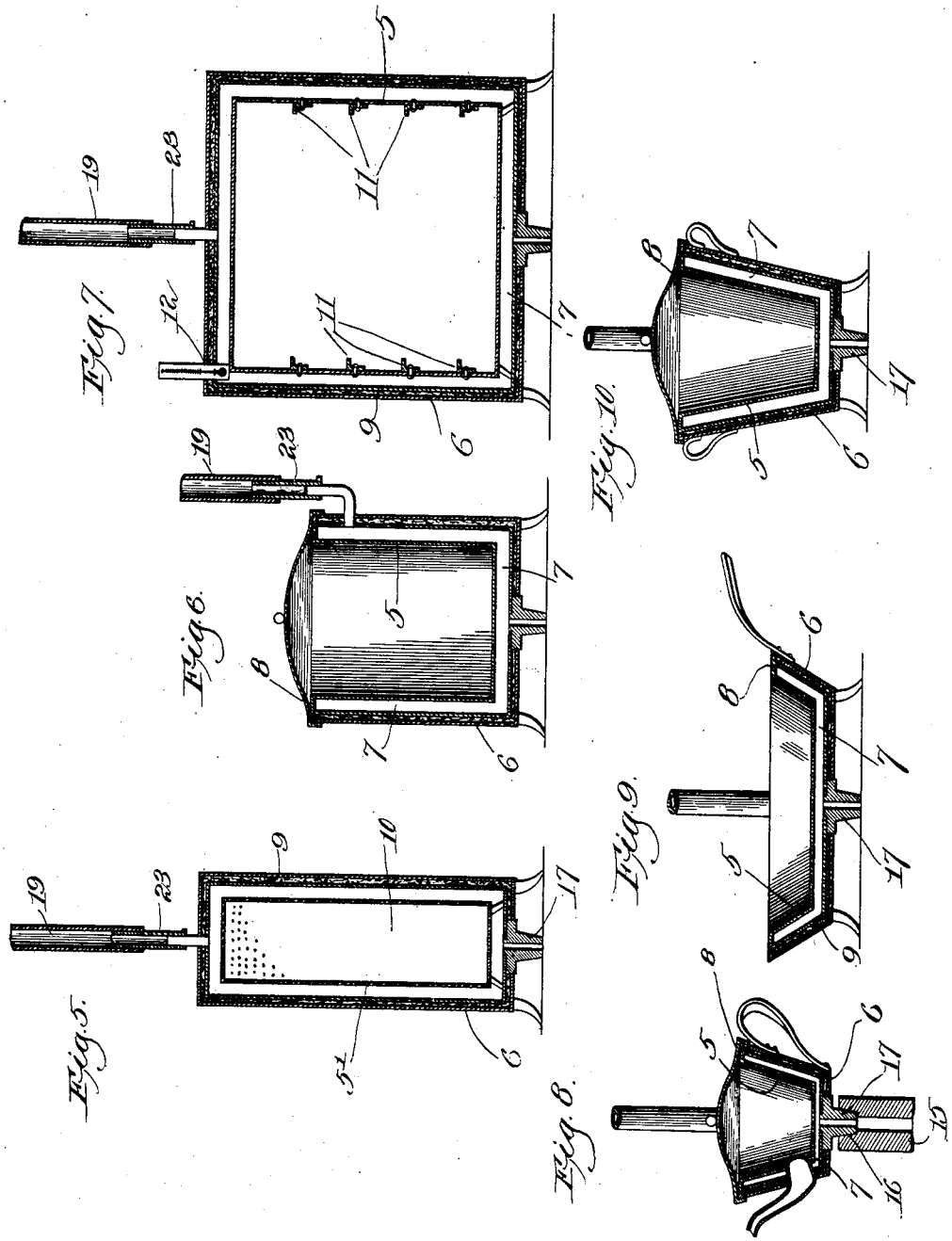

No. 762,590. Patented June 14, 1904.

UNITED STATES PATENT OFFICE.

ROBERT S. LAWRENCE, OF BOSTON, MASSACHUSETTS, ASSIGNOR TO CONSOLIDATED INVENTORS CORPORATION, OF BOSTON, MASSACHUSETTS, A CORPORATION OF SOUTH DAKOTA.

COOKING-RANGE.

SPECIFICATION forming part of Letters Patent No. 762,590, dated June 14, 1904.

Application filed August 3, 1903. Serial No. 168,059. (No model.)

*To all whom it may concern:*

Be it known that I, ROBERT S. LAWRENCE, a citizen of the United States, residing at Boston, in the county of Suffolk and State of Massachusetts, have invented an Improvement in Cooking-Ranges, of which the following description, in connection with the accompanying drawings, is a specification, like numerals on the drawings representing like parts.

This invention aims to provide a novel cooking-range in which the cooking is done entirely with hot air which is delivered to jacketed cooking utensils.

The invention comprises a heater by means of which pure air may be heated and one or more interchangeable cooking utensils, each having double walls forming between them an air-space into which hot air from the heater is conducted. Suitable means are provided for regulating the amount of air delivered to the air-jacket of each utensil, so that where a plurality of utensils are being used at the same time the amount of heat which is delivered to each utensil may be independently regulated.

Among the advantages of my invention are that the heater may be situated some distance from the place where the cooking is done, so that the cook does not have to face a hot range, the kitchen may be kept absolutely free from smoke, smudge, and all poisonous gases, and the amount of heat delivered to each utensil is under absolute control independently, so that various foods requiring different degrees of heat for their cooking may all be cooked at the same time.

In the drawings I have shown one form of my invention.

Figure 1 illustrates a perspective view of one corner of a kitchen, showing my improved cooking-range. Fig. 2 is a vertical section through one form of heater for the hot air. Fig. 3 is a section on the line $x\ x$, Fig. 2. Fig. 4 is a section on the line $y\ y$, Fig. 2. Figs. 5 to 10 show vertical sections through different forms of cooking utensils, Fig. 5 being a section through a broiler, Figs. 6 and 10 showing sections through different forms of kettles or pots, Fig. 7 being a vertical section through an oven, Fig. 8 being a vertical section through a tea-kettle, and Fig. 9 being a vertical section through a saucepan.

The heater for heating the air is designated generally by 3 in Fig. 1, and in this form of my invention I conduct the hot air from the heater to the various cooking utensils by taking said air into an air-main 4, to which each of the various utensils are detachably secured, as will be more fully hereinafter described.

Each cooking utensil has double walls, forming between them an air-jacket into which hot air from the main 4 is conducted. The pots, tea-kettle, saucepan, and oven (shown in Figs. 6 to 10) each have their inner walls 5 of some suitable metal which is a conductor of heat, and while any metal of this character may be used I prefer aluminium because of its lightness.

The outer wall 6 of each utensil is a heat-insulated wall, so as to prevent any loss of heat by radiation. The space 7 between the walls forms the air-jacket, into which the hot air from the main 4 is delivered. In the kettles and saucepan and similar utensils which are open at the top the inner and outer walls 5 and 6 are connected at the rim or upper edge of the utensil, as shown at 8. The outer wall may be made heat-insulated in any suitable way, either by making said wall completely of a material which is a non-heat conductor or poor heat-conductor or by making said wall with two shells, between which is packed some suitable non-heat-conducting material 9— such, for instance, as infusioned earth, asbestos, or even ashes, sand, or any other material which is a poor conductor of heat.

The broiler (shown in Fig. 5) has the outer wall constructed as above described, and the inner wall 5' is perforated, so that the hot air may pass through it into the interior chamber 10, in which the meat, fish, or other food article is placed to be broiled.

The oven (shown in Fig. 7) will preferably be provided with the usual rests 11, on which the shelves of the oven may be placed, and a thermometer 12 will also preferably be used, by which the temperature in the oven may be determined.

The broiler and oven have one side thereof removable or mounted on hinges to form openings through which access may be had to their interiors. The other utensils will be provided with suitable covers 14, if desired.

It is desirable that each utensil be supported so that it can be readily removed from the range, thus making the utensils interchangeable, and in this form of my invention I accomplish this by providing the main 4 with a series of nipples 15, each having a socket 16 in its upper end, into which a perforated nipple 17 on the bottom of the utensil sets, as seen best in Fig. 8. The perforation in the nipple 17 leads into the air-jacket 7, so that hot air from the main 4 is conducted through the nipples into said jacket. Each nipple 15 is preferably provided with a suitable valve 18, by means of which the amount of hot air delivered to the air-space 7 can be regulated. The hot air is discharged from the air-space through suitable pipes 19, which lead into a warming-oven or hot closet 20, situated in any suitable position, but preferably above the main 4, as shown in Fig. 1. From this hot closet the gases escape through the outlet-pipe 21. Each of the pipes 19 will preferably be provided with a valve 22, by means of which the volume of hot air escaping from the air-space of each utensil may be regulated. In order to permit each utensil to be removed, I have provided a detachable connection between said utensil and its pipe 19. As herein shown, each utensil has projecting therefrom a pipe 23, which telescopes into the lower end of pipe 19, as best seen in Figs. 5 and 6. When it is desired to remove any utensil, the latter is simply raised until the nipples 17 and 15 are disengaged, the pipe 23 meanwhile telescoping into the pipe 19. Thereafter the utensil may be swung sidewise slightly and removed entirely from the stove or range, it being understood that the valves 22 and 15 for said utensil will be closed prior to its removal.

In order to heat water in large quantities, I have provided a water-heater 25, in which is inclosed a coil 26, connected at one end by a pipe 27 with the main 4 and at the other end by a pipe 28 with the warming-oven 20. Both the pipes 27 and 28 are provided with suitable valves 30, so that when desired hot air from the main 4 may be delivered to the heating-coil 26 and the water in the boiler heated.

Figs. 2, 3, and 4 show the form of heater for heating the hot air which I prefer to use. This comprises a suitable casing, the walls 32 of which are preferably made of some non-heat-conducting material, so as to prevent any loss of heat by radiation. The interior of the chamber forms a heating-chamber 31, and in the lower end of said chamber is a burner 33, of any suitable or usual construction, which is adapted to burn either gas or oil.

34 designates a smoke-pipe through which the products of combustion pass to the chimney, and this is preferably provided with a suitable damper 35.

In the chamber 31 are a plurality of drums 36, which are connected with each other by short pipes 37. Each drum is divided centrally by a partition 38 into two chambers, and each partition or diaphragm is provided near its periphery with a plurality of apertures 39. The upper drum has connected thereto an inlet-pipe 40, through which cool air is delivered to the various drums in succession. I have arranged the drums in staggered relation to each other, one drum engaging one side of the casing 32 and the next engaging the other side thereof, as seen in Figs. 2 and 3, so that the heated products of combustion from the burner have to take a sinuous course in the chamber, as indicated by the arrows $a$. The lower drum $36^a$ has connected thereto an outlet-pipe 43, which extends to the main 4 and through which hot air is delivered from the heater to the main. This pipe 43 will preferably pass down beneath the floor of the kitchen, so as to be out of the way, and to prevent loss of heat by radiation I propose to cover said pipe with asbestos or some other similar non-heat-conducting material. 44 represents a valve to control the amount of air delivered through the pipe. The lower drum $36^a$ is illustrated as extending entirely across the inside of the casing and is cut away or recessed, as at 45, to allow the passage of the heated products of combustion from the burner. By making the connection between the successive drums at the central portion of the drums and providing each drum with the partition 38, having the apertures near its periphery, the air in passing through the various drums is compelled to take the sinuous course indicated by the arrows $b$, and thus it is brought into contact with a large extent of heating-surface, and consequently becomes extremely hot before it is delivered through the discharge-pipe 43.

I prefer to use some suitable force mechanism for forcing the air through the various drums, and I have illustrated such conventionally as a fan 49 of any suitable construction, which takes air through the pipe 50 and delivers it into the pipe 40. I propose to make the pipe 50 of such a length that its end is above the poisonous microbic strata and foul gases of decomposition and earthy exhalation, so that absolutely pure air may be taken into the drums and heated and delivered to the cooking utensil. This is a very important part of my invention, as it enables the cooking to be done entirely with pure air instead of with air laden with impurities.

It is not absolutely necessary to employ the force-fan 49, as by extending the exhaust-pipe or chimney 21 sufficiently high the necessary draft may be secured to draw the air through the chimney.

There is a special advantage derived from taking the cool air into the top drum and feeding said air downwardly through the drums, for by this means the air as it enters the first drum comes in contact with the coolest gases and is displaced downwardly or in a direction opposite to that of the heated products of combustion.

The air in the lowest drum, which is the hottest, receives its heat directly from the flame of the burner, so that it is possible to take the air from the heater at this point several degrees hotter than if it were taken from the upper drum.

While I have shown one way in which my invention may be embodied, I do not wish to be limited to the precise construction shown, as various changes in the shapes, constructions, and proportions of the parts may be made without departing from the spirit of the invention.

Having described my invention, what I claim as new, and desire to secure by Letters Patent, is—

1. In a cooking-range, an air-heater, a main connected to said heater, said main having a plurality of nipples, and one or more interchangeable cooking utensils each having double walls forming between them a closed air-space, and a nipple which fits into one of the nipples on the main, whereby the closed air-space of each utensil is connected to the main.

2. In a cooking-range, an air-heater, a main connected thereto and having one or more valved nipples, and a plurality of interchangeable cooking utensils each having double walls forming between them a closed air-space, and a perforated nipple to fit one of the nipples of the main.

3. In a cooking-range, an air-heater, a main connected thereto, a plurality of interchangeable cooking utensils detachably connected to said main, each utensil having double walls forming between them a closed air-space, and a valve to control the communication between each air-space and the main independently.

4. In a cooking-range, an air-heater, a plurality of interchangeable cooking utensils each having double walls forming between them a closed air-space, the outer wall of each utensil being insulated, means to detachably support each utensil independently, and means to deliver independently-regulated quantities of hot air to the closed air-space of each utensil.

5. In a cooking-range, an air-heater, a plurality of detachably-supported cooking utensils each having double walls forming between them an air-space, means to conduct heated air from the heater to the air-space of each utensil, and a common chamber into which the air from the space of each utensil is discharged.

6. In a cooking-range, an air-heater, a plurality of interchangeable detachably-supported cooking utensils each having double walls forming between them a closed air-space, means to conduct heated air from the heater to the air-space of each utensil and means to regulate the amount of air delivered to each utensil independently.

7. In a cooking-range, one or more cooking utensils each having double walls forming between them an air-space, means to deliver hot air into the air-space of each utensil, and a warming-oven into which the air passes after leaving each utensil.

8. In a cooking-range, a heater to heat air, an air-main connected to the heater, a plurality of interchangeable utensils detachably secured to the main, each utensil having double walls forming between them an air-space into which hot air is delivered from the main, and a common discharge-pipe through which the air from all the utensils is discharged.

9. In a cooking-range, a heater to heat air, an air-main connected to the heater, said main having nipples provided with sockets, and a plurality of cooking utensils each having a nipple to set into a socket whereby the utensils are detachably supported by the main, each utensil having double walls forming between them an air-space into which air is delivered from the main.

10. In a cooking-range, a heater comprising a casing having a burner therein, a plurality of connected drums in said casing, means to force air through said drums successively, one or more cooking utensils each having double walls forming between them an air-space, and means to conduct the heated air from the last drum to each of said utensils.

In testimony whereof I have signed my name to this specification in the presence of two subscribing witnesses.

ROBERT S. LAWRENCE.

Witnesses:
 LOUIS C. SMITH,
 JOHN C. EDWARDS.